United States Patent [19]
Takahara et al.

[11] Patent Number: 4,773,026
[45] Date of Patent: Sep. 20, 1988

[54] PICTURE DISPLAY MEMORY SYSTEM

[75] Inventors: Yasuaki Takahara, Yokohama; Atsuki Edamura, Fujisawa; Tetsuya Ikeda, Yokohama; Teiji Okamoto, Fujisawa, all of Japan

[73] Assignee: Hitachi, Ltd., Tokyo, Japan

[21] Appl. No.: 654,461

[22] Filed: Sep. 26, 1984

[30] Foreign Application Priority Data

Sep. 26, 1983 [JP] Japan ................. 58-176234

[51] Int. Cl.⁴ .................. G06F 3/153; G06F 9/00; G09G 1/28
[52] U.S. Cl. .................... 364/518; 340/747; 340/750; 340/799; 364/521
[58] Field of Search ............ 364/518; 340/717, 747, 340/750, 798–800; 358/21 R

[56] References Cited

U.S. PATENT DOCUMENTS

| | | | |
|---|---|---|---|
| 4,160,273 | 7/1979 | Marlowe et al. | 340/750 |
| 4,303,986 | 12/1981 | Lans | 340/750 |
| 4,468,662 | 8/1984 | Tanaka | 340/799 |
| 4,500,875 | 2/1985 | Schmitz | 340/799 |
| 4,511,962 | 4/1985 | Machida et al. | 340/750 |
| 4,520,358 | 5/1985 | Makino | 340/799 |
| 4,528,636 | 7/1985 | Robinson III | 340/799 |
| 4,622,547 | 11/1986 | Furukawa et al. | 340/750 |

FOREIGN PATENT DOCUMENTS

| | | | |
|---|---|---|---|
| 0093954A | 11/1983 | European Pat. Off. | 364/518 |
| 85/02050 | 5/1985 | PCT Int'l Appl. | 340/747 |

*Primary Examiner*—Felix D. Gruber
*Attorney, Agent, or Firm*—Antonelli, Terry & Wands

[57] ABSTRACT

A picture display memory system with structure for changing over an address selection signal and data input signal fed to a picture memory depending upon whether the picture information is consecutive in the depth direction or is consecutive in the horizontal direction. When the picture information in the depth direction is to be written, the address selection signal is supplied to the picture memory to select a particular bit in the horizontal direction of the picture memory as an address, and the picture information of the depth direction is written into memory as a data input. When the picture information in the horizontal direction is to be written, bits in the horizontal direction are selected in accordance with the data contents of the picture pattern in the horizontal direction, and data stored in a register which stored beforehand the picture information of the depth direction is written into memory as a data input.

5 Claims, 14 Drawing Sheets

PICTURE MEMORY CONFIGURATION

PICTURE DISPLAY MEMORY SYSTEM

BACKGROUND OF THE INVENTION

The present invention relates to a picture display memory system and in particular to a picture display memory circuit which is suitable to write data into a picture memory at high speed.

In a picture display memory system for reading out picture information stored in a memory and for graphically displaying the picture information on a screen such as a cathode ray tube (hereinafter abbreviated as CRT), LCD or plasma display, the amount of information per dot of pixel tends to increase for displaying a more natural picture. Thus, a picture memory having a large capacity is needed and it takes much time to write data.

FIG. 1 shows an example of the bit configuration in such a conventional picture memory. The display screen is divided into 320 pixels (dots) in the horizontal direction and is divided into 200 lines in the vertical direction. For each pixel (dot), four bits of information are assigned to each of three primary colors R (red), G (green) and B (blue). As illustrated in FIG. 2, the picture information of one pixel is subjected to D/A conversion for each of the primary colors R, G and B to feed analog R, G and B signals to a CRT. Thus, each pixel (dot) of display can be colored in $2^{12} = 4,096$ possible ways. As a result, it becomes possible to reproduce a natural picture which compares favorably with a picture derived from a conventional analog video signal.

FIG. 3A shows an example of a method for writing picture information into the picture memory illustrated in FIG. 1.

In the example illustrated in FIG. 3A, the picture memory is divided into blocks, each of which is $\Delta X$ in horizontal length, $\Delta Y$ in vertical length and $\Delta Z$ in depth. In one block, the picture data of pixels are successively written into the picture memory using the sequential line scanning method starting from the upper left pixel located on the X-Y plane corresponding to the screen toward the lower right pixel, as illustrated in FIG. 3A. For writing data at high speed, addresses are assigned in the picture memory as illustrated in FIG. 3B. Data bits $D_0$ to $D_{11}$ representing the color information are assigned to locations in the Z direction of the memory space corresponding to the display screen, i.e., in the depth direction at a dot position. And the addresses of the picture memory are assigned to respective pixels. It is advantageous to use writing by a central processing unit (hereafter abbreviated as CPU) in the above-described addressing method.

The manner of writing picture data into the picture memory having addresses assigned as described above will now be described by referring to a picture memory circuit illustrated in FIG. 4. In FIG. 4, a data bus 1, an address bus 2 and a write control signal 3 are coupled to the CPU. Address selection signals 6a and 6b are supplied from an address decoder 5 to a picture memory 4a and an address register 9, respectively. A write control circuit 8a composed of NAND gates controls inputs to each chip of the picture memory 4a responsive to the write control signal 3 fed from the CPU.

In the picture memory 4a, 12 bits arranged in the depth direction of the display screen are assigned to each memory chip as illustrated in FIG. 3B. The information for designating a bit pattern to be written into the picture memory 4 is stored into the address register 9 by the CPU beforehand. The write control circuit 8a supplies AND outputs of the bit pattern stored in the register 9 and the write control signal 3 fed from the CPU to each chip of the picture memory 4a. When data is to be written into a specified address of the picture memory 4a, therefore, data is written into addressed bit positions of the picture memory according to the bit pattern stored in the register 9.

Even if data is written into blocks one after another as illustrated in FIG. 3A, logical ORing by means of software is not required when data at a different bit position must be overwritten at an address of the picture memory 4a having data already written thereon. It is necessary only to write the added data into the picture memory 4a provided that the information designating the bit positions in which data is to be written is stored into the register 9 beforehand.

In the picture memory circuit of the prior art illustrated in FIG. 4, however, an address of the picture memory is assigned to a set of data bits arranged in the depth direction. In addition, the CPU can designate an address only for each pixel. When a consecutive picture pattern must be written in the horizontal direction of the display screen for the purpose of reading a character pattern stored in a ROM to transfer it to the picture memory, therefore, the picture pattern continuing in the horizontal direction must be divided into data bits and thereafter the picture information composed of the color information and graduation information must be written in the depth direction for each pixel. This results in a problem that an excessively long processing time is required.

SUMMARY OF THE INVENTION

Therefore, an object of the present invention is to provide a picture display memory circuit having a high speed processing function of writing not only color information which is consecutive in the depth direction of the display screen, but also picture information having consecutive pixels in the horizontal direction.

Another object of the present invention is to provide a picture memory circuit configured so as to compensate decrease in writing speed caused by use of a small quantity of memory elements each of which has a large capacity.

For attaining the above-described objects, in a picture display memory circuit according to the present invention, the picture memory is formed by a two-dimensional array having as many bits as one pixel in the depth direction and having an arbitrary number of bits in the horizontal direction. And there is provided means for changing over the address selection signal and data input signal fed to the picture memory depending upon whether the picture information such as color information which is consecutive in the depth direction is to be written or the picture information which is consecutive in the horizontal direction is to be written. When the picture information which is consecutive in the depth direction is to be written, the address selection signal is supplied to the picture memory to select a particular bit in the horizontal direction of the picture memory as an address, and the picture information of the depth direction is written into the picture memory as a data input. When the picture information which is consecutive in the horizontal direction is to be written, bits in the horizontal direction of the picture memory are selected in accordance with the data contents of the picture pattern in the horizontal direction, and data stored in the register which stored beforehand the picture information of the depth direction are written into the picture memory as a data input.

There is provided a picture display memory system, wherein data is written into the picture memory using a time division technique and the above-described picture memory is formed by an array of memory chips each of which has a capacity not less than that of a plurality of dots, comprising (a) a write control circuit including a write pulse generator for continuously producing write pulses a predetermined number of times when it is activated by the CPU, (b) a write data register for holding data to be written into the picture memory, (c) address update means for holding a write address and for updating the address every time data are written into the picture memory, and (d) data hold means for holding data fed from the CPU at least while consecutive writing is being executed, thereby controlling whether data are written into a series of memory chips of the picture memory or not on the basis of the data held in the data hold means.

DESCRIPTION OF THE PREFERRED EMBODIMENTS

Figure 5:
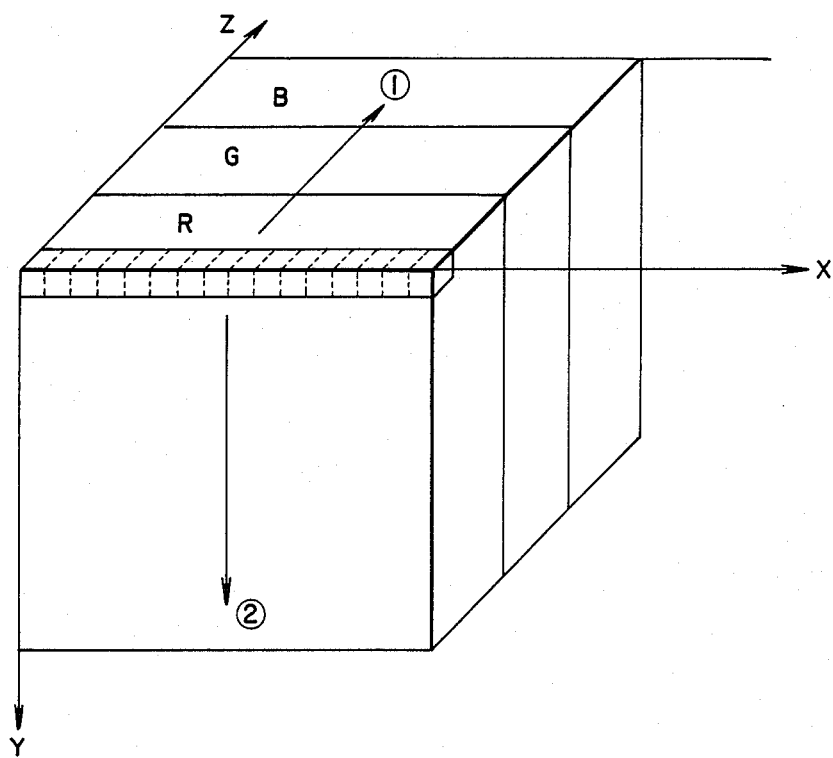
Figure 6:
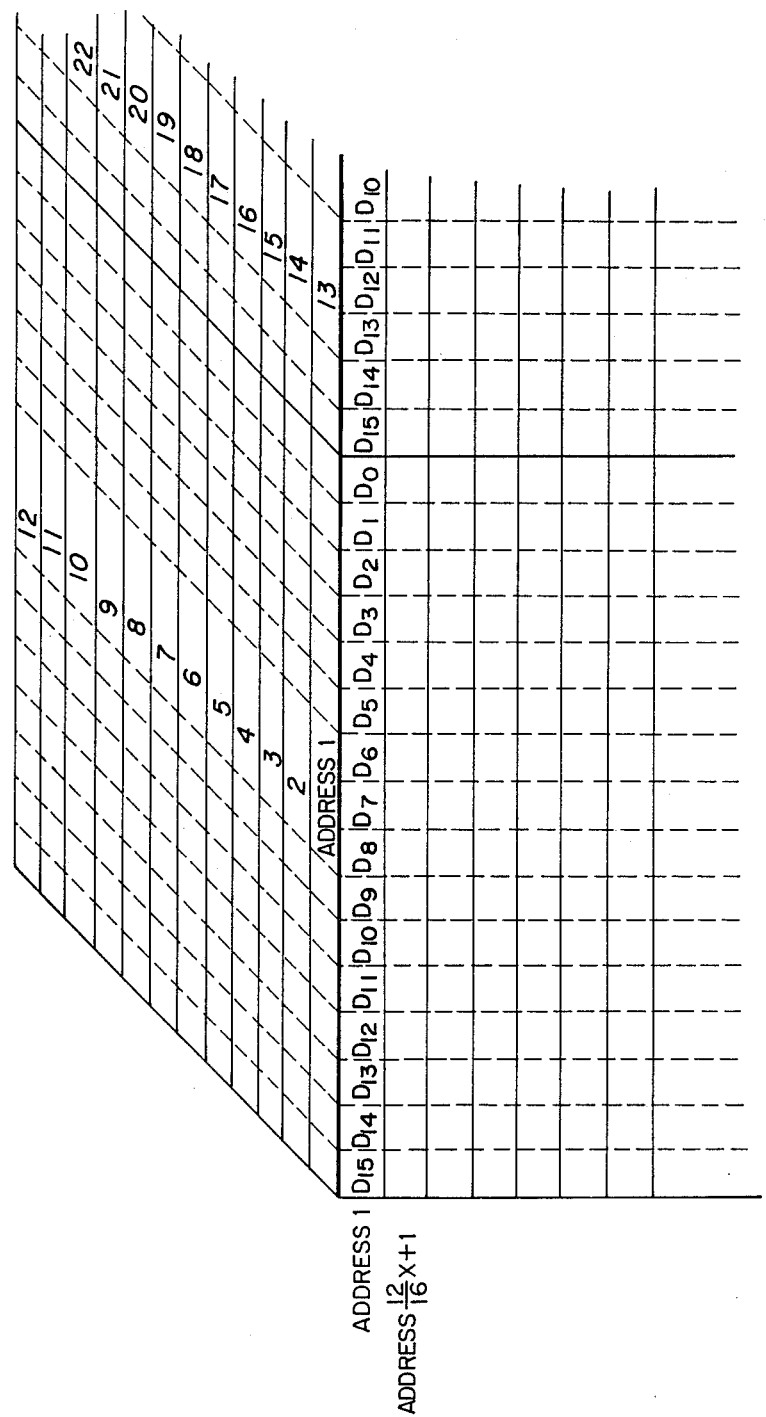

FIG. 5 shows an example of method for writing a fixed pattern of letters or symbols into the memory. Pattern data composed of 16 bits, which have been read out of a memory such as a Chinese character ROM for storing fixed patterns, are written in the horizontal direction, i.e., raster scan direction X at a single time as illustrated in FIG. 5. Then, a series of the color information composed of 12 bits is successively written in the Z direction ①. Subsequently, data is written in the Y direction ②. For writing data at high speed, it is advantageous to assign data bits to each pixel as illustrated in FIG. 6.

Figure 1:
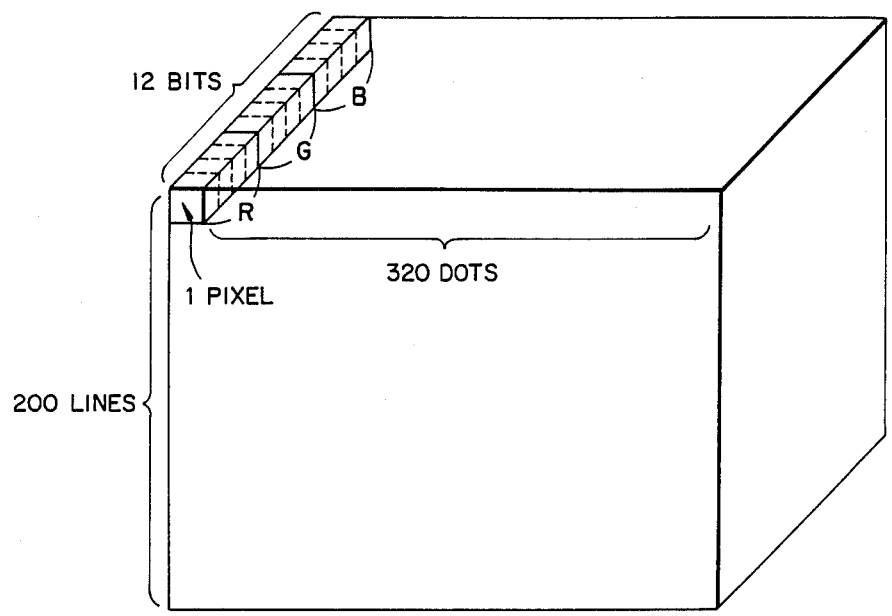
FIG. 1 and FIG. 12 illustrate examples of bit configuration of a picture memory.
Figure 2:
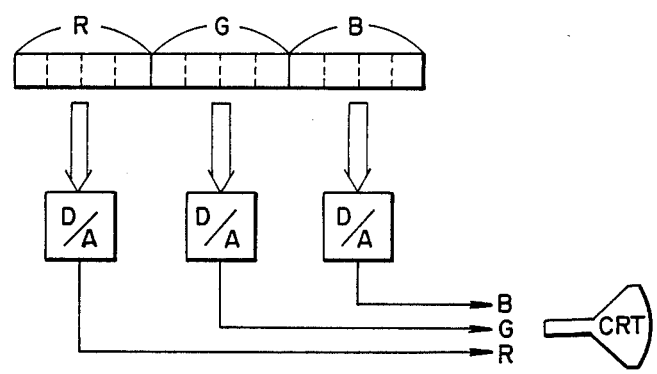
FIG. 2 illustrates the concept of readout processing of picture information for one pixel of the picture memory.
Figure 3A:
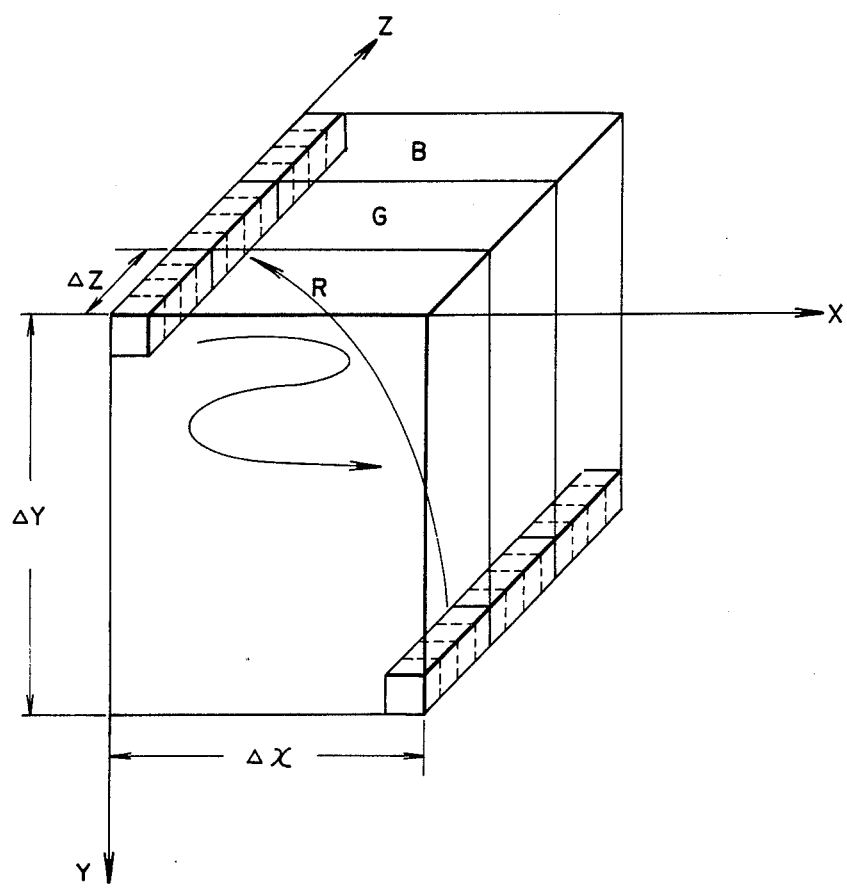
Fig. 3A and FIG. 5 are diagrams for explaining methods for writing data into the picture memory.
Figure 3B:
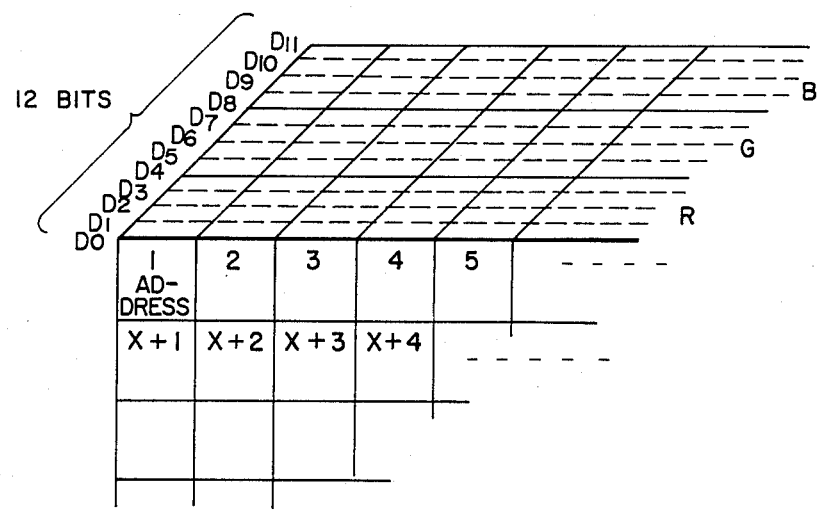
FIG. 3B and FIG. 6 illustrate addressing methods of the picture memory.
Figure 4:
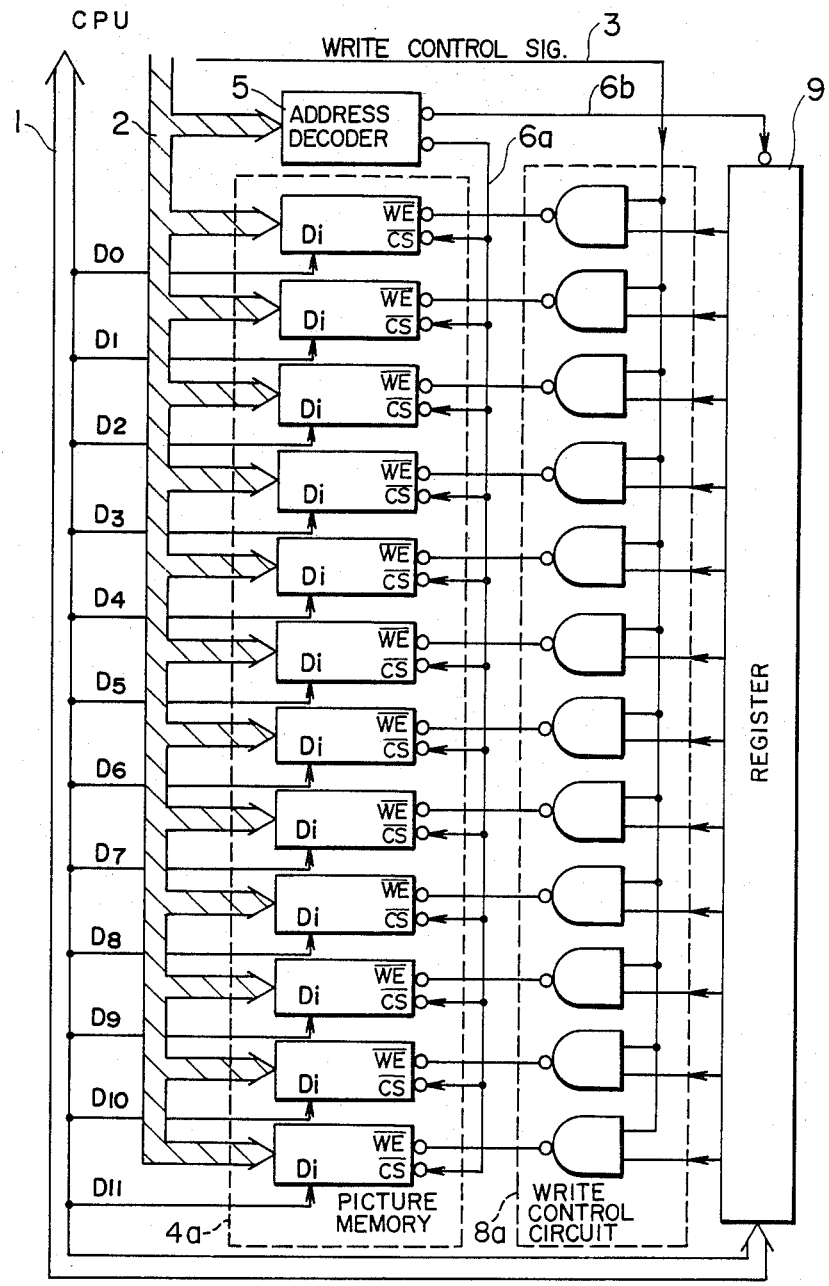
FIG. 4 is a block diagram of a prior art picture memory circuit.
Figure 7:
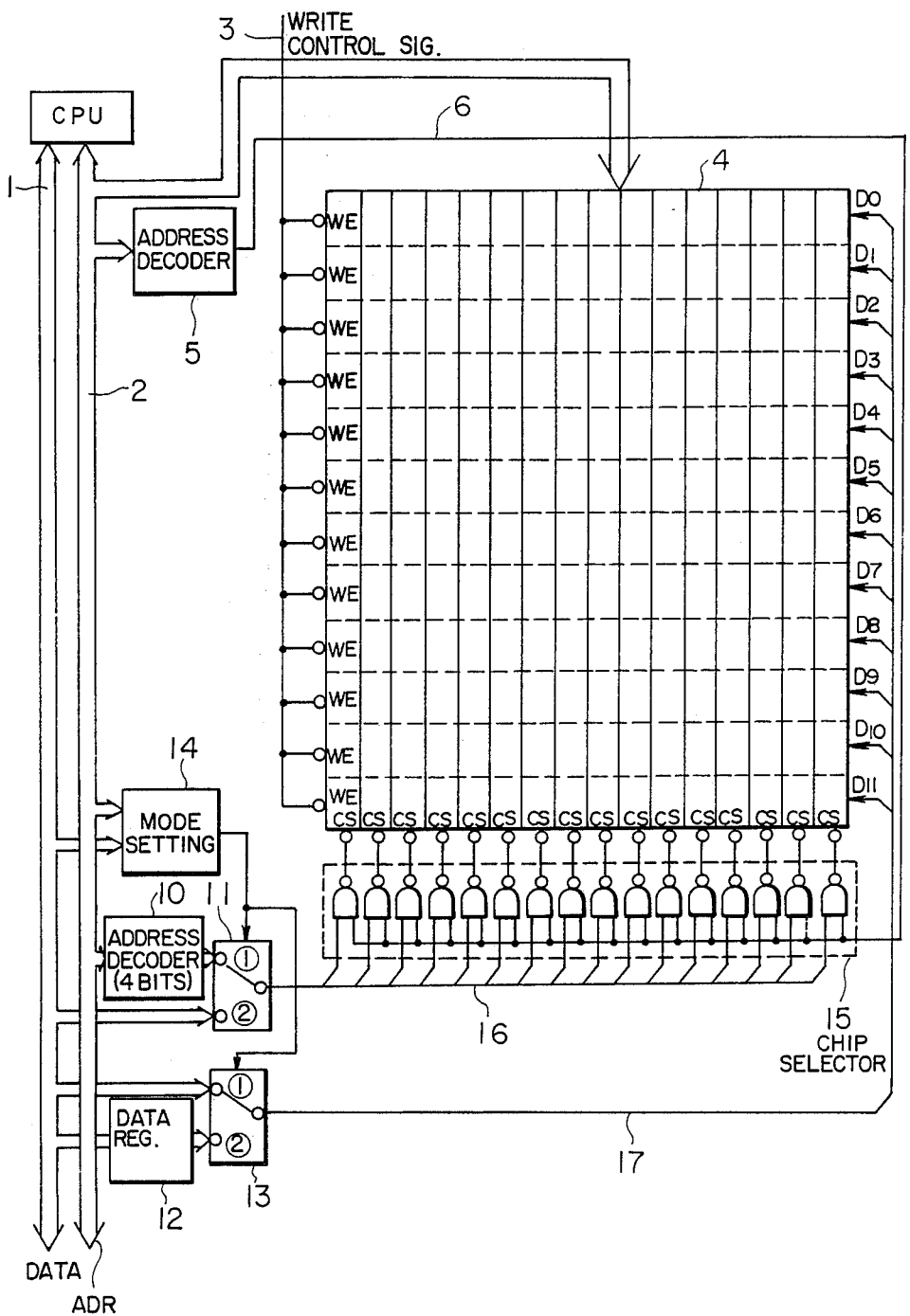
FIG. 7 shows a block diagram of a picture memory circuit for explaining the present invention.

FIG. 7 illustrates a memory circuit whereby the two writing methods indicated in FIGS. 3 and 5 can be performed at high speed. Operation of the circuit illustrated in FIG. 7 will now be described briefly.

In FIG. 7, a data bus 1, an address bus 2, and a write control signal 3 are coupled to a CPU. A picture memory 4 is composed of a two-dimensional array having 12 bits for color data in the depth direction of each pixel and having 16 bits for word or image data in the horizontal direction. Reference numeral 5 denotes an address decoder and reference numeral 6 denotes an address selection signal for the picture memory 4. An address decoder 10 decodes four least significant bits ($A_1$, $A_2$, $A_3$ and $A_4$) of an address fed from the CPU. A switching circuit 11 selects either 16 outputs fed from the address decoder 10 or 16-bit data fed from the data bus 1 to send out a memory chip selection signal 16. Each memory chip is composed of a 4-Kbit static RAM, for example. A data register 12 stores the information to be written in the depth direction of a pixel. A switching circuit 13 selects either 12-bit data fed from the data bus 1 or data stored in the data register 12 to send out a data input signal 17 of the picture memory. A mode setting register 14 stores data for controlling selection in the multiplexers 11 and 13. A chip selection control circuit 15 selects each bit out of 16 bits arranged in the horizontal direction of the picture memory in response to the address selection signal 6.

When picture information must be written in the depth direction of a pixel of the picture memory illustrated in FIG. 7 as shown in FIG. 3A, the CPU sets depth direction writing in the mode setting register 14. The register 14 is used to store the writing direction mode. In this mode, the switching circuits 11 and 13 are changed over to positions ①. Accordingly, the output signal of the address decoder 10 is selected as the memory selection signal 16. When the picture data is to be written into the picture memory, the memory chip corresponding to one pixel is selected out of 16 pixels arranged in the horizontal direction of the picture memory in accordance with the address signal fed from the CPU. On the other hand, the data bus signal fed from the CPU is selected as the data input signal 17 to be fed to the picture memory 4. Accordingly, data $D_0$ to $D_{11}$ can be written in the depth direction for each pixel.

When picture information which is consecutive in the horizontal direction of the display screen as illustrated in FIG. 5 must be written into the picture memory, the horizontal direction writing mode is set in the CPU mode setting register 14, and the multiplexers 11 and 13 are changed over to positions ②. Thereby, the data bus signal fed from the CPU is selected as the memory selection signal 16. When picture data is written into the picture memory, only bits supplied with CPU data signals having "1" levels are selected and bits supplied with CPU data signals having "0" levels are not selected. On the other hand, the data signal fed from the data register 12 for designating write bits in the depth direction of the picture memory 4 is selected as the data input signal 17. Therefore, color data for one pixel which has been previously stored in the data register 12 is written in the picture memory 4 at a selected address.

As described above, the single writing of one pixel and simultaneous writing of 16 bits can be effected by using the circuit illustrated in FIG. 7. When picture information which is consecutive in the horizontal direction is written by using this circuit, all of the picture information to be written is supplied as the memory selection signal at one time. Thus, as many pixel memory rows as bits of the picture information are required. As a result, a large number of memory chips are needed. In the circuit illustrated in FIG. 7, 12 chips (12 bits) are required in a memory row of one pixel. A total of 192 memory chips are needed for 16 rows. Since the memory capacity of a memory chip is increasing year by year, however, it is possible to construct the circuit with a smaller number of memory chips from the viewpoint of capacity.

Figure 8:
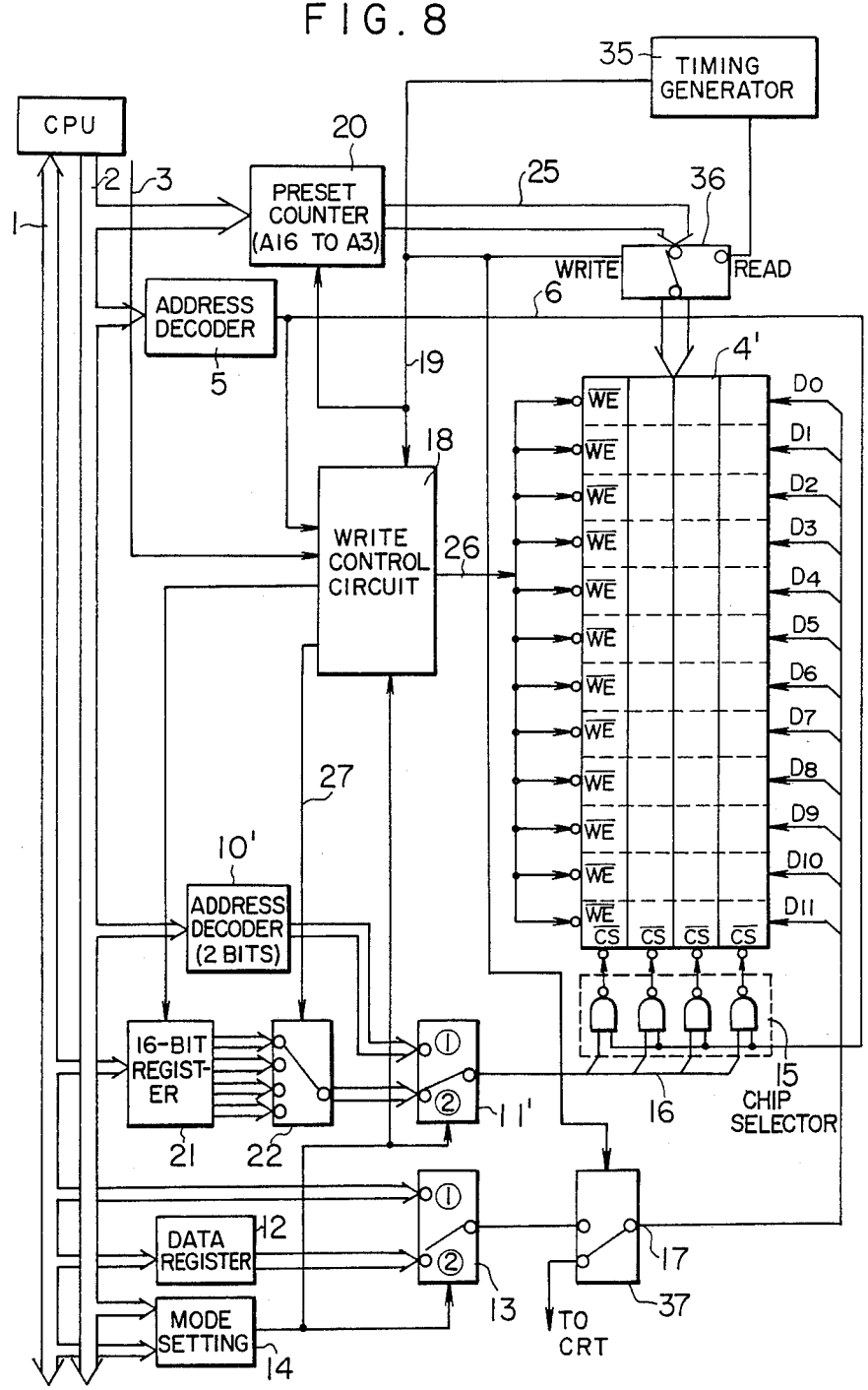
FIG. 8 and FIG. 13 illustrate block diagrams of embodiments of picture memory circuit according to the present invention.

FIG. 8 is a block diagram of a further embodiment of the present invention, which represents an improvement over the arrangement of FIG. 7. Reference numerals in FIG. 8 that are like reference numerals in FIG. 7 refer to like components or like signal lines, and are not described further.

In FIG. 8, a picture memory 4' is composed of a two-dimensional array of four-chips, each having 12 bits in the depth direction of each pixel and having 4 pixels (4 bits) in the horizontal direction. An address decoder 10' decodes the two least significant bits ($A_1$ and $A_2$) of an address fed from the CPU. A register circuit 21 stores 16-bit picture information which is consecutive in the horizontal direction. A selection circuit 22 selects a group of 4 bits from the picture information of 16 bits stored in the register 21. A switching circuit 11' selects either the output of the address decoder 10' or the output of the selection circuit 22. A write control circuit 18 controls the number of operations for writing data into the picture memory 4' in accordance with the mode set in a mode setting register 14. A write timing pulse 19 produced by a timing pulse generator 35 provides timing for writing data into the picture memory 4'. A preset counter 20 temporarily stores the address (A16 to A3) fed from the CPU. The address stored in the preset counter 20 is increased by a value of 4 at a rising edge of the timing pulse. A read/write address switching circuit 36 selects either the write address or read address.

Figure 11:
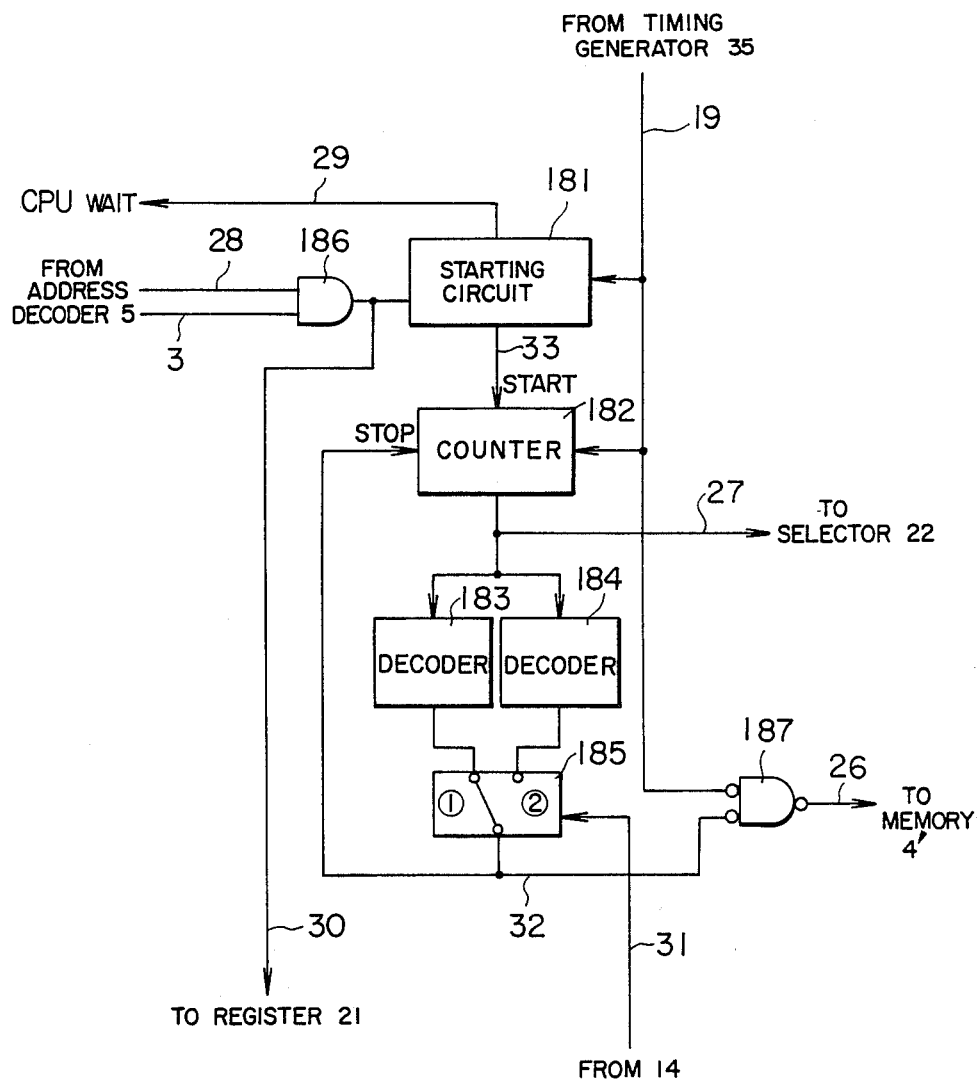
FIG. 11 is a block diagram of an example of a write control circuit illustrated in FIG. 8.

The configuration of the memory write control circuit 18 will now be described by referring to FIG. 11.

A starting circuit 181 starts a write operation of the picture display circuit in response to the write request fed from the CPU and sends out a start pulse 33 and a CPU$_{WAIT}$ signal 29. The CPU$_{WAIT}$ signal 29 informs the CPU that the picture display circuit has started a write operation and functions to synchronize the operation timing of the CPU with that of the picture display circuit.

A counter circuit 182 starts counting occurrences of the write timing pulse 19 after being cleared and stops counting upon receiving a stop pulse 32. The counter circuit 182 sends out a data selection signal 27 for representing the number of writing operations. The selection signal 27 is supplied to the switching circuit 22 to select every four bits of the picture information stored in the register 21.

The output of the counter 27 is also fed to decoder circuits 183 and 184. The decoder circuits 183 and 184 decode the number of writing operations to yield the stop pulse. The decoder circuit 183 is configured to send out the stop pulse when the output of the counter 182 has reached "1", and the decoder circuit 184 is configured to send out the stop pulse when the output of the counter 182 has reached "4". When data is to be written in the depth direction (Z-direction), a write operation is effected only once because the decoder 183 is selected by the switching circuit 185. When data is to be written in the horizontal direction (X-direction), a write operation is effected four times because the decoder 184 is selected by the switching circuit 185. The switching circuit 22 is switched by the selection signal 27 for each write operation.

When the picture information is written in the depth direction for each pixel as illustrated in FIG. 3A by using the picture memory circuit illustrated in FIG. 8, the operation is effected in the same way as that of the picture memory circuit illustrated in FIG. 7. That is to say, the depth direction writing mode is set in the mode setting register 14. Thus, switching circuits 11' and 13 are switched to positions ①. In this mode, the output signal of the address decoder 10' is selected as the memory selection signal 16. Memory chips corresponding to one pixel are specified out of memory chips corresponding to 4 pixels in accordance with the address $A_1$ and $A_2$. Thus, the data fed from the CPU is written into the specified memory row.

When data which is consecutive in the horizontal direction as illustrated in FIG. 5 is to be written, the CPU sets the mode setting register 14 to the horizontal writing mode. Accordingly, the switching-circuits 11' and 13 are switched to positions ②. The operation mode in the write control circuit 18 is altered at the same time by operating selector 185. When a write request from the CPU is issued to the picture memory in this mode, at first the address signal fed from the CPU is temporarily stored in the preset counter 20 and the data signal is stored in the register 21. Subsequently, four write operations in total are carried out by the write control circuit 18 in synchronism with the write timing pulse 19. In the first write operation, 4-bit data D15 to D12 are selected as the output of the selection circuit 22 to be sent out as the memory selection signal 16. That is to say, in the first write operation, only a chip corresponding to a bit having a level "1" (i.e. each one pixel memory) among 4 bits D15 to D12 is selected by the gate circuit 15. Thus, the color information which has been stored in the register 12 beforehand is written into the selected memory chip of the picture memory 4'.

Since the write control signal 19 is fed to the preset counter 20, the write address is increased by 4 addresses immediately after completion of the write operation. In the second write operation, 4-bit data D11 to D8 are sent out as the memory selection signal 16. As a result, chips corresponding to the "1" level bit are selected and the color information stored in the register 12 is written into the selected chips of the picture memory 4'. Immediately after the write operation has been completed, the write address is increased by 4 addresses in the counter. In the third write operation, D7 to D4 are sent out as the memory selection signal. In the fourth write operation, 4 bits D3 to D0 are sent out as the memory selection signal.

Figure 9:
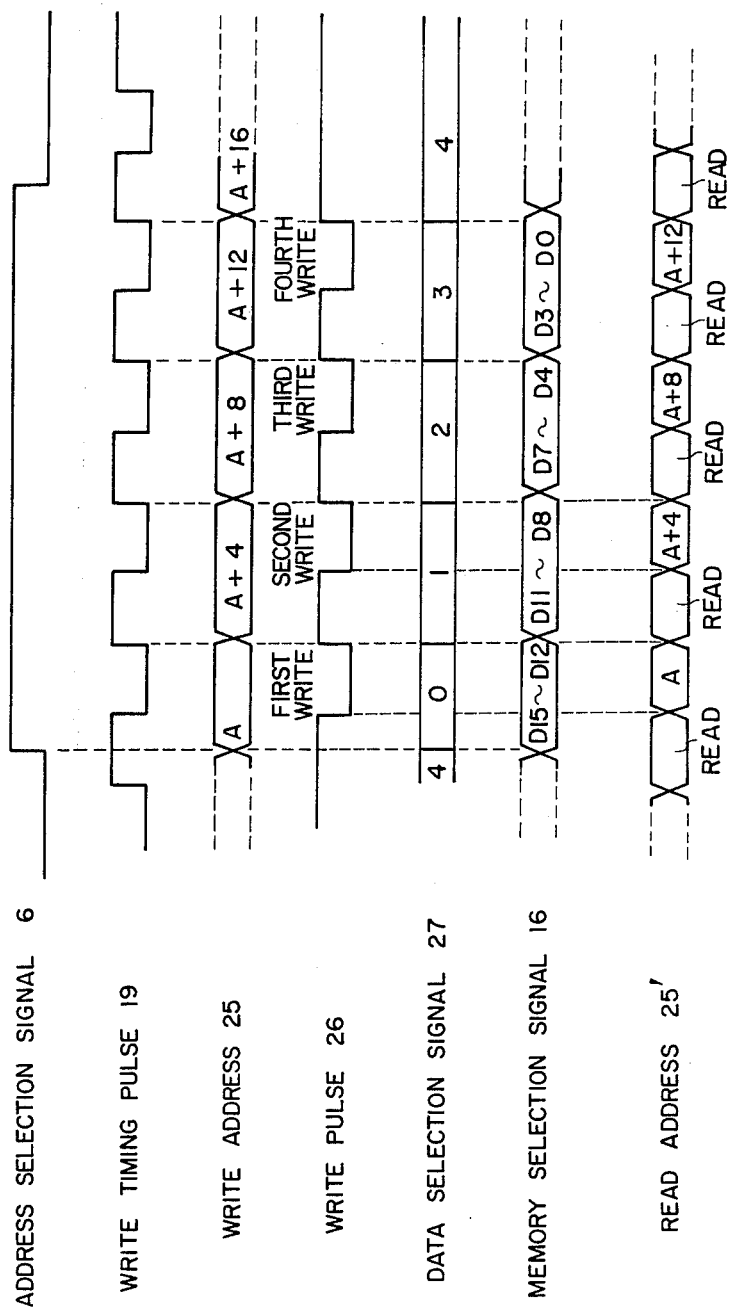
FIG. 9 shows a timing diagram for writing data into the picture memory in case of the embodiment illustrated in FIG. 8.
Figure 10:
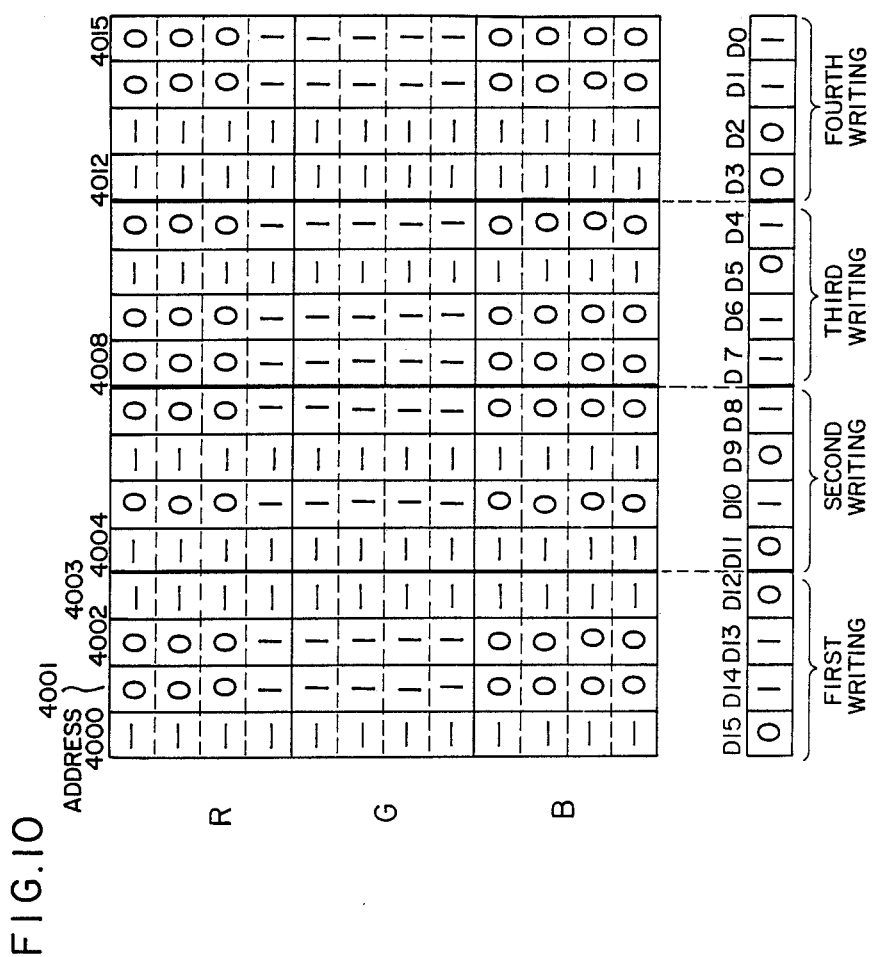
FIG. 10 shows the picture information written in the horizontal direction of the picture memory in case of the embodiment illustrated in FIG. 8.

The write operation in the horizontal write mode will now be described in more detail by referring to FIGS. 9 and 10. FIG. 9 is an operation timing chart. FIG. 10 shows the manner of writing data into the picture memory. In FIG. 9, the first signal is the address selection signal 6 fed from the address decoder 5. The second and third signals are the write timing pulse 19 and a write address 25, respectively. The fourth signal is a write pulse 26 fed to the picture memory. The fifth signal is a data selection signal 27 fed from the write control circuit 18 to the selection circuit 22. The sixth signal is the memory selection signal 16.

In the example illustrated in FIGS. 9 and 10, 16-pixel data extending from address 4000 to address 4015 is written into the memory. When data is written into the picture memory by the CPU, the address signal fed from the CPU is latched to yield the write address signal 25. At the same time, the address selection signal 6 turns "1" and the data fed from the CPU is temporarily stored in the register 21. In addition, the data selection signal 27 is reset to "0". Since the address selection signal 6 is simultaneously supplied to the memory chips of 4 pixels in the circuit of this embodiments, memory chips of 4 pixels ranging from addresses 4000 to 4003 can be selected. In the first write operation, 4-bit data D15 to D12 are sent as the memory selection signal to execute a writing operation. Since bits D14 and D13 are "1" in the example illustrated in FIG. 10, the contents of the data register 12 are written into the picture memory at addresses 4001 and 4002, respectively supplied with bits D14 and D13. Since bits D5 and D12 are "0", however, data is not written into the picture memory at addresses 4000 and 4003. After the first write operation has been completed, the write address 25 is increased by 4 addresses at the rising edge of the write timing pulse. The resultant write address is 4004 and the picture memory of addresses 4004 to 4007 can be selected. In addition, the data selection signal 27 is increased to "1" to produce memory selection signals D11 to D8. Under this state, the second write operation is carried out. Since D10 and D8 are "1" in the example illustrated in FIG. 10, the contents of the data register 12 are written into addresses 4005 and 4007. In the same way, data is written into addresses 4008 and 4011 in accordance with the memory selection signals D7 to D4 in the third write operation. In the fourth write operation, data is written into addresses 4012 to 4015 in accordance with memory selection signals D3 to D0. After the fourth write operation has been completed, the data selection signal 27 assumes a value "4" at the rising edge of the write timing pulse, a series of write operations being completed.

After the read/write address switching circuit 36 is switched by a cycle steal timing pulse, display data is read out of the picture display memory 4' while the write pulse 26 is "1", i.e., while the read address 25' indicates the "READ" mode as illustrated in FIG. 9. During this period, the display address is supplied as the read pulse and the data lines 17 of the picture memory are connected to the display screen (CRT) circuit via a read/write switching circuit 17 which is switched by the timing signal 19. As a result, the display data is supplied to the CRT circuit.

Since access to the picture memory by the CPU is effected while the write pulse is "0", a display operation to the CRT circuit is not disturbed by the access from the CPU. In other words, the display operation to the CRT is always carried out normally.

When a picture pattern composed of 16 pixels which are consecutive in the horizontal direction of the display screen is to be written into the memory, it can be attained by writing 4 pixels four times in this embodiment. By providing memory chips for only 4 pixels, therefore, it is possible for the CPU to carry out processings as if there are memory rows for 16 pixels. That is to say, the number of required memory chips can be reduced to one fourth as compared with memory rows for 16 pixels in FIG. 7.

In this embodiment, the picture memory array has 12 bits in the depth direction and has 4 bits in the horizontal direction, and four serial writing operations are carried out. Even if different arrangement and different number of serial writing operations are adopted, the effect of the present invention is not lost at all.

In the above described embodiments, the picture information of one pixel corresponds to one CPU address when data is written in the depth direction. Even if a plurality of pixels correspond to one CPU address or one pixel corresponds to a plurality of CPU addresses, the present invention can be employed by altering the signal supplied as the memory selection signal.

Figure 12:
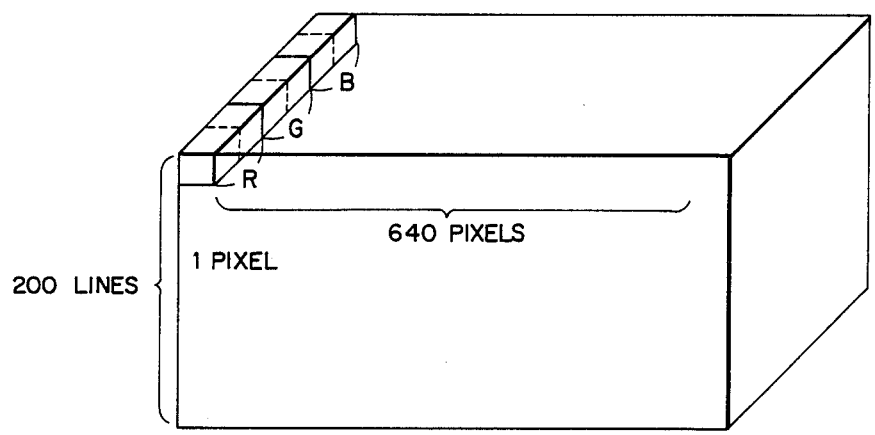
Figure 13:
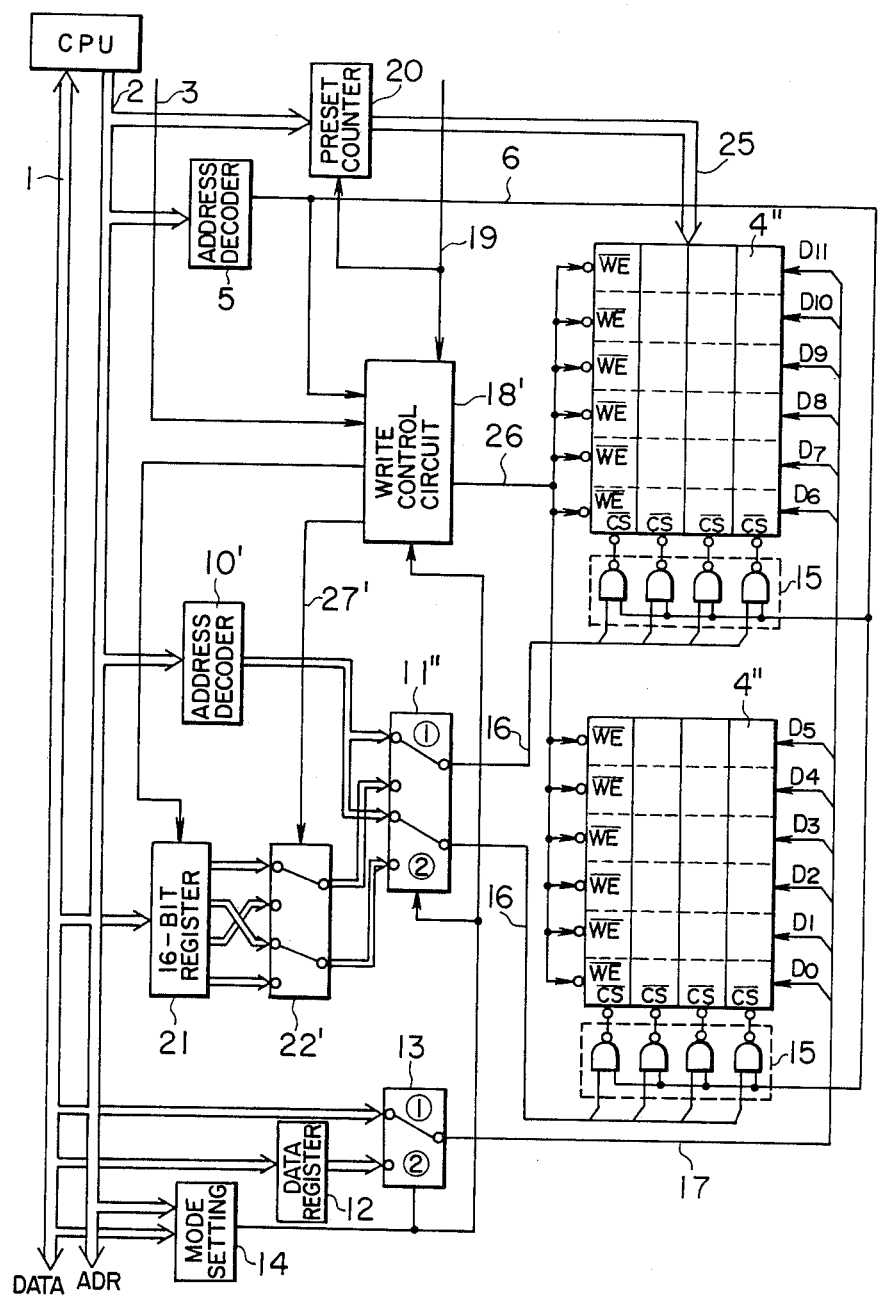

A second embodiment of the present invention in which a plurality of pixels correspond to one CPU address is shown in FIGS. 12 and 13. FIG. 12 shows the pixel configuration of the second embodiment. FIG. 13 shows a block diagram of the second embodiment. The second embodiment will now be described. In the second embodiment, one pixel is composed of color information of 6 bits in total, including 2 bits for red (R), 2 bits for green (G), and 2 bits for blue (B) as illustrated in FIG. 12. And two pixels correspond to one CPU address. Reference numerals in the block diagram of FIG. 13 that are like reference numerals in the first embodiment of FIG. 8 refer to like components or like signal lines, and are not described further. A picture memory 4" is composed of a two-dimensional array having 6 bits in the depth direction of each pixel and having 8 pixels in the horizontal direction. An address decoder 10' specifies an address so that each pixel may be read from or written into the picture memory. A selection circuit 22' selects a group of 8 bits from the picture information of 16 bits stored in the register 21. A switching circuit 11" selects either the output of the address decoder 10' or the output of the selection circuit 22' for each write operation. A write control circuit 18' controls the number of operations for writing data into the picture memory 4" in accordance with the mode set in a mode setting register 14.

When the picture information is written in the depth direction in the above-described picture memory circuit illustrated in FIG. 13, switching circuits 11" and 13 are switched to positions ①. In this mode, the output signal of the address decoder 10' is selected as the memory selection signal 16. Out of the picture memory 4" having a capacity for 8 pixels, memory chips corresponding to 2 pixels are selected in accordance with the addresses $A_1$ and $A_2$ from CPU, and the CPU data is written into them. At this time, data D0 to D5 is written into memory chips corresponding to one pixel, and data D6 to D11 is written into memory chips corresponding to the other pixel. That is to say, 2 pixels are assigned to one CPU address in the embodiment illustrated in FIG. 12.

Figure 14:
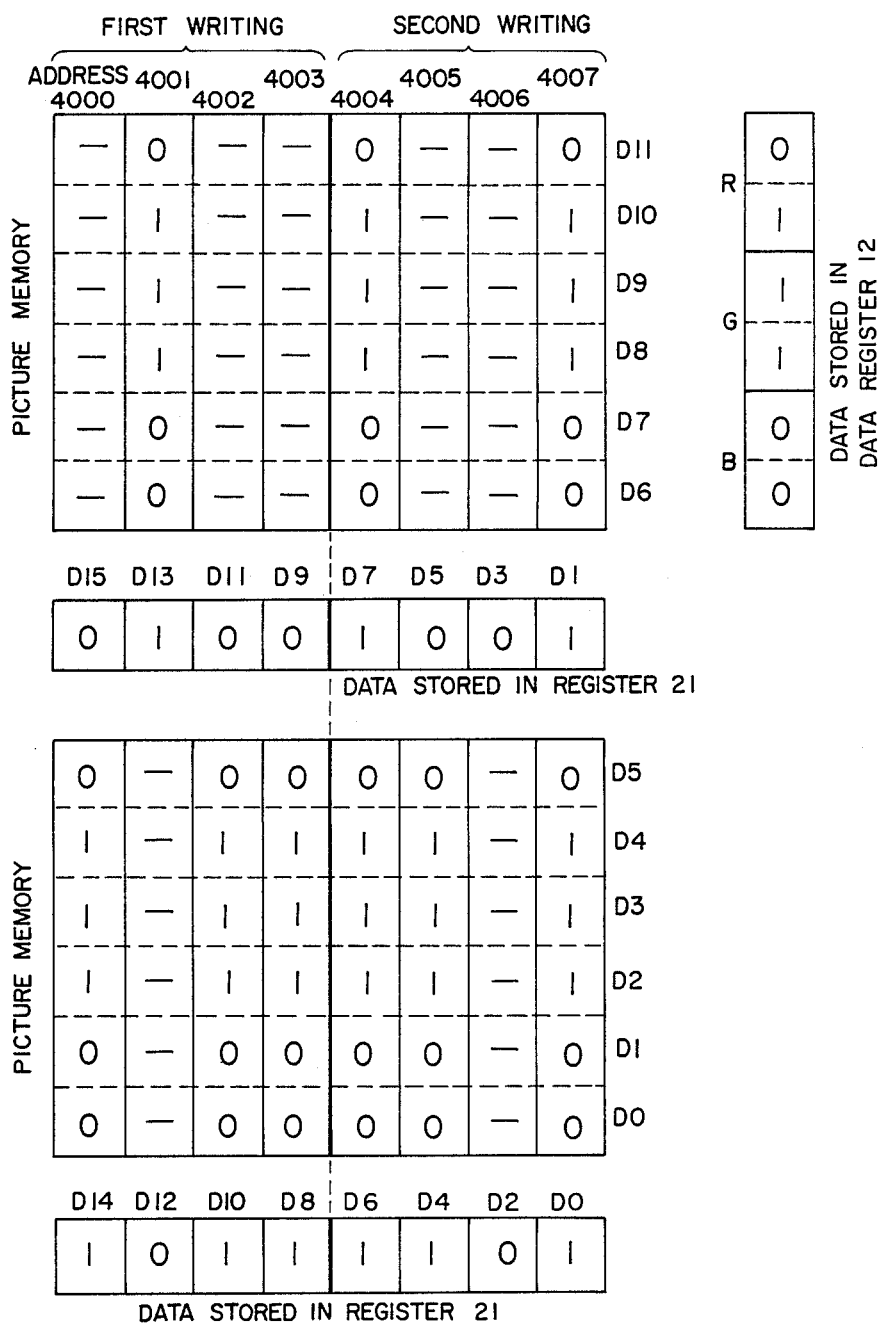
FIG. 14 shows the picture information written in the horizontal direction of the picture memory in case of the embodiment illustrated in FIG. 12.

The manner of writing the picture information in the horizontal direction in the embodiment illustrated in FIG. 13 will now be described by referring to FIG. 14 as well. FIG. 13 shows how the picture information is written into the picture memory 4". When the picture information which is consecutive in the horizontal direction is to be written, the switching circuits 11" and 13 are switched to positions ②. In this mode, a write operation is carried out twice by the write control circuit 18'. In the first write operation, 8-bit data D15 to D8 are selected by the selection circuit 22' to be sent out as the memory selection signal. In the example illustrated in FIG. 14, bits D14, D13, D10 and D8 assume "1" levels. Accordingly, data stored in the data register 12 is written in a lower pixel of address 4000, an upper pixel of address 4001, a lower pixel of address 4002, and a lower pixel of address 4003. In the second write operation, 8-bit data D7 to D0 are selected as the memory selection signal. In this second write operation, data stored in the data register 12 is written into pixels corresponding to bits D7, D6, D4, D1 and D0 in the example illustrated in FIG. 13.

In the above-described second embodiment, it is possible to carry out writing equivalent to writing data into an array of 6 by 16 information bits by using the picture memory having an array of 6 by 16 information bits. That is to say, the number of memory chips can be reduced to a half.

In addition, it is easily presumed that the present invention can be applied to the case where the picture information of one pixel corresponds to a plurality of CPU addresses by altering the supply of the memory selection signal and the number of write operations to the picture memory.

In this embodiment, there are two modes, and the picture information is written in the depth direction in one mode and the picture information is written in the horizontal direction in the other mode. Since the present invention is effective to the mode in which data is written in the horizontal direction, a similar effect can be obtained by applying the present invention to a picture memory circuit having only the mode in which data is written in the horizontal direction.

In writing data into the picture memory having a plurality of picture information bits for each pixel according to the embodiment of the present invention, especially when the picture information is to be written in the horizontal direction, the picture information in the horizontal direction fed from the CPU is written into the picture memory in a time division scheme. As compared with the method whereby data is written in parallel all together, the number of memory elements can be significantly reduced, resulting in a reduced circuit size and a reduced cost. Although the write data is used as the memory selection signal in the above description, it is also permitted to control the write control signal in accordance with the write data.

We claim:

1. A picture display memory system comprising:
    a central processing unit;
    memory means, coupled via an address signal line and a data signal line to said central processing unit, and having m storage devices for storing color picture information for m picture elements, each of each storage devices having a plurality of storage areas for storing respective ones of l bits in commonly addressable storage locations;
    picture information hold means for temporarily holding color picture information to be written into the storage locations of said memory means;
    write control means activated in response to said central processing unit for carrying out successive operations of writing data into said memory means a predetermined number n times;
    counter means presettable by said central processing unit to an address of data to be written in said memory means for supplying a write address to said memory means;
    address update means for updating by m said address held in said counter means each time data is written into said memory means under control of said write control means; and
    control information hold means for receiving from said central processing unit and holding n by m bits of control information at least during a period lasting from the time when said write control means is activated until n successive write operations to said memory means have been completed, and for supplying said information of n by m bits as selection signals to said storage devices of said memory means, so that said information held in said picture information hold means is written into said memory means or not depending upon said information held in said control information hold means in each of n write operations carried out by said write control means.

2. A picture display memory system according to claim 1, wherein said picture information hold means is connected to receive and hold color picture information comprising l bits, and said control information hold means is connected to the storage devices of said memory means for controlling writing of said held color information into those storage devices of said memory means selected by the control information held in said control information hold means and in storage locations of the selected storage devices designated by addresses based on the contents of said counter means.

3. A picture display memory system according to claim 2, wherein said counter means comprises a presettable counter coupled between said central processing unit and said memory means, and said address update means comprises a timing pulse generator for providing write timing pulses to said presettable counter so that the address held in said presettable counter is increased by m every time a write timing pulse is supplied from a timing pulse generator thereto, and further comprising switching means responsive to a data selection signal fed from said write control means for selecting m bits among the n by m bits of control information from said control information hold means to generate a selection signal for controlling writing of color information into said memory means, said switching means being connected between said control information hold means and said memory means.

4. A picture display memory system according to claim 3, further comprising:
    memory selection signal generation means for generating a memory selection signal to select a particular one of said m storage devices of said memory means in accordance with an address signal received from said central processing unit via said address signal line;
    memory selection changeover means for selecting either the memory selection signal fed from said memory selection signal generation means or the data signal fed from the central processing unit which has been held in said control information hold means, and for supplying the selected signal to storage device selection signal inputs of said memory means;
    data input switching means for selecting either a data signal fed from said color picture information hold means or a data signal fed from said central processing unit and for supplying the selected signal to data inputs of said memory means; and
    write mode setting means for storing a signal indicating either a first mode in which data is written into one storage device of said memory means or a second mode in which data is simultaneously written into a plurality of storage devices of said memory means, and for generating a signal for switching said memory selection switching means and said data input switching means in accordance with the stored mode indicating signal.

5. A picture display memory system comprising:

a central processing unit;

a memory coupled via an address signal line and a data signal line to said central processing unit, said memory having m storage devices for storing picture information, each of said storage devices having at least one addressable storage location of l bits;

memory selection signal generation means for generating a first memory selection signal in response to an address signal fed from said central processing unit via said address signal line, said memory selection signal being used to select a particular one of said m storage devices of said memory;

selection switching means connected to said data signal line and said memory selection signal generation means for selecting either said first memory selection signal received from said memory selection signal generation means or a data signal forming a second memory selection signal received from said central processing unit and for supplying the selected first or second memory selection signal to storage device selection signal inputs of said memory;

data hold means for holding l-bit data to be written into said memory;

data input switching means connected to said data signal line and said data hold means for selecting either the data signal fed from said data hold means or an l-bit data signal fed from said central processing unit and for supplying the selected data signal to data inputs of said memory;

write mode control means for storing a signal indicating either a first mode in which data is written into one storage device of said memory or a second mode in which data is simultaneously written into a plurality of storage devices of said memory and for controlling the operation of said selection switching means and said data input switching means in accordance with the mode indicating signal stored therein, so that said memory selection signal fed from said memory selection signal generation means and said data signal fed from the central processing unit are supplied respectively to memory selection inputs and data inputs of data memory when a signal indicating said first mode is stored in said write mode control means, and so that a memory selection signal fed from said central processing unit and said picture information held in said data hold means is supplied respectively to said memory storage device selection signal inputs and said data inputs of said memory when a signal indicating said second mode is stored in said write mode control means.

* * * * *